Dec. 5, 1967    G. EISENMAN ET AL    3,356,595
GLASS ELECTRODE COMPOSITION AND METHOD OF USING SAME FOR
MEASURING SODIUM ION CONCENTRATION
Filed Sept. 21, 1964
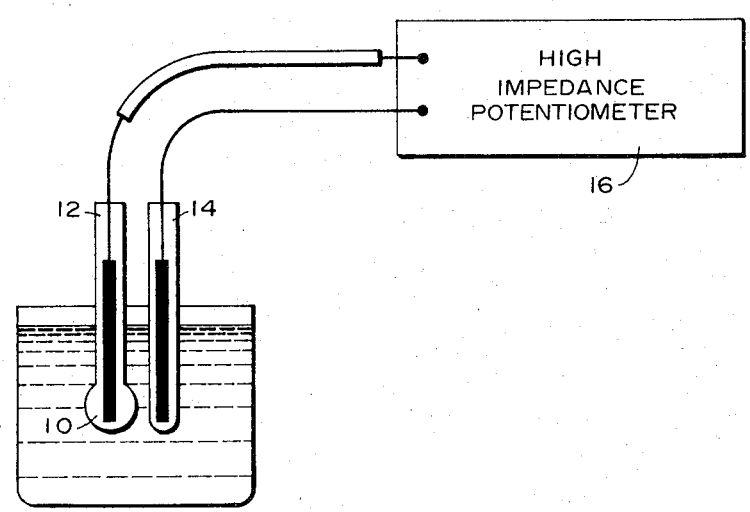
INVENTORS
George Eisenman
James W. Ross
BY
ATTORNEY 3,356,595
GLASS ELECTRODE COMPOSITION AND METHOD OF USING SAME FOR MEASURING SODIUM ION CONCENTRATION
George Eisenman, Salt Lake City, Utah, and James W. Ross, Newton, Mass., assignors to Corning Glass Works, Corning, N.Y., a corporation of New York
Filed Sept. 21, 1964, Ser. No. 397,732
15 Claims. (Cl. 204—1)

This invention relates to glass electrodes, and the glass compositions for active or sensing portions thereof, that have high selectivity for Na+ in the presence of K+, as well as additionally in the presence of H+ and other cations, over a wide range of pH. A primary object and purpose of the glass electrodes according to the present invention is to selectively measure Na+ activity or concentration in ionic mixtures or solutions.

Recently glass electrodes having high selectivity for Na+ in mixtures of Na+ and K+ were developed by utilizing, for the sensing or membrane portions of the electrodes, glass compositions consisting primarily of the three components: sodium or lithium oxide, alumina and glass network forming oxides. Compositions having a ratio of mole percent $Al_2O_3$ to mole percent $Na_2O$ equal to at least 1 are known (from United States Patent 2,829,090) to be at least 100 and as high as 250 times as selectively sensitive for Na+ than for K+. Other compositions having a ratio of mole percent $Al_2O_3$ to mole percent $Li_2O$ equal to at least 1:3 are known (from British Patent 924,845) to have a selectivity for Na+ over K+ by a factor of at least 100 and up to 10,000 or more.

We have now discovered that certain glass compositions consisting essentially of lithium oxide, gallium oxide and glass network forming oxide (such as $SiO_2$ and/or $GeO_2$), in which the ratio of mole percent of $Li_2O$ to the mole percent of $Ga_2O_3$ is less than 3 have notable selective sensitivity to Na+ in the presence of K+ over a wide range of pH and even in the presence of other cations. In defining the glass compositions according to this invention, the specified mole percent ratio is determined by calculating all of lithium and gallium in the glass composition as the indicated oxide, e.g. $Li_2O$ and $Ga_2O_3$. Selectivity factors for our Na+ selective glass compositions range from moderate values up to substantially in excess of three million.

The invention will best be understood with reference to the accompanying drawing wherein the sole figure diagrammatically illustrates conventional equipment for measuring cation concentration or activity and employing one embodiment of an otherwise conventional glass electrode 12 with an active portion, bulb or membrane 10 made of a glass composition according to this invention. The glass electrode 12 is operatively connected to a standard half-cell 14, such as saturated KCl-calomel, via conventional high impedance, high gain electrometric amplification equipment 16.

The instrument may be calibrated with known solutions containing mixtures of H+, Na+ and K+ as is well known in the art, and then the K+ concentration of unknown solutions can be determined directly by subjecting the glass and reference electrodes to the unknown solutions according to the usual procedure. For example, one can employ the following known equation for mixtures having a wide range of pH (e.g. approximately 5 to 11):

$$E = E° + \frac{RT}{F} \ln [(Na^+) + K_{NaK}(K^+)]$$

wherein:
$E$ = measured E.M.F.
$E°$ = standard potential
$R$ = ideal gas equation constant
$T$ = absolute temperature
$F$ = Faraday constant
(Na+) and (K+) = activity or concentration of the ionic species Na+ and K+, respectively
$K_{NaK}$ = empirical constant for a given glass composition and ionic pair Na+ and K+, when $$<1, \frac{1}{K_{NaK}}$$

represents selectivity factor for Na+ in preference to K+ on a mole for mole basis.

At an appropriate pH, the equipment is used to measure of potentiometer 16 the potentials of a 0.1 N solution of Na+ and a 0.1 N solution of K+ using a glass electrode of this invention. Employing the above equation, the values of $E°$ and $K_{NaK}$ can be calculated. Next, the same equipment is used to measure the potential of an unknown solution. Then, employing the above equation again, one can insert the value of (K+), when known or measured by other known means (e.g. flame photometer or glass electrode selective for K+), and solve for (Na+). For extreme precision, one can solve simultaneously the equations for the potentials of the unknown mixture, measured on the one hand with our Na+ selective electrode of this invention and on the other hand with a K+ selective electrode, using the values of $E°$ and $K_{NaK}$ for each of these electrodes in the respective equation.

An example of our novel Na+ selective glass compositions that was melted and formed into a membrane according to conventional techniques is $LGS_{15-15}$ (i.e. a glass composed essentially of 15 mole percent $Li_2O$, 15 mole percent $Ga_2O_3$ and 70 mole percent $SiO_2$—the subscripts indicate the $Li_2O$ and $Ga_2O_3$ contents in mole percent, and the letters indicate all the oxide constituents except for incidental impurities, in the glass, namely, $Li_2O$, $Ga_2O_3$ and $SiO_2$). This glass has a ratio of mole percent $Li_2O$ to mole percent $Ga_2O_3$ equal to 1.0 and was found to exhibit a Na+ selectivity factor substantially in excess of 3,000,000 (i.e. it was more than 3,000,000 times more selective for Na+ than for K+ in mixtures of these two ions on a mole for mole basis). After a substantial period of aging, this glass still exhibited a Na+ selectivity factor in excess of 20,000.

Another example glass composition within the present invention is $LGS_{20-10}$ with a ratio of mole percent $Li_2O$ to mole percent $Ga_2O_3$ equal to 2. This example exhibited a Na+ selectivity factor of about 1,000.

The maximum ratio of mole percent $Li_2O$ to mole percent $Ga_2O_3$ equal to less than 3 is rather critical in that, above this ratio limit, the selectivity for Na+ over K+ becomes extremely low or nonexistent. It is preferred to keep the ratio at least as low as 1.5 for optimum results.

The active or sensitive glass composition according to this invention need contain only more than a fraction of a mole percent each of $Li_2O$ and $Ga_2O_3$ in the substantial absence of constituents other than glass network forming oxides. However, at least about 2 mole percent of each oxide (i.e. $Li_2O$ and $Ga_2O_3$) is preferred and these are usually the practical minimum in most cases. The more common network forming oxide $SiO_2$ may be partially or totally replaced by other glass network forming oxides, for example, $GeO_2$. Preferably, the glass network forming oxides comprise at least about 50 mole percent for durability of the glass and not more than about 75 mole percent in order to avoid undesirably high electrical resistivity in the glass.

It should be understood that the property of Na+ selectivity relative to K+ is a function of the $Li_2O:Ga_2O_3$ mole percent ratio as specified above regardless of the presence or absence of any other oxides in addition to the network forming oxides in the glass (except, for example, substantial amounts of other alkali metal oxides). One or more of other oxides such as MgO, CaO, BaO, SrO, CuO, ZnO, $Fe_2O_3$ and $B_2O_3$ can be added up to several mole percent (e.g. up to about 3 mole percent ZnO for chemical durability) to improve the physical and/or chemical properties of the glass without seriously affecting the Na+ selectivity of the electrode. Moreover, it is within the scope of this invention to substitute at least one oxide selected from the group consisting of $Na_2O$, $K_2O$, $Rb_2O$ and $Cs_2O$ for some of the $Li_2O$ such that the sum of the mole percents of $Na_2O$, $K_2O$, $Rb_2O$ and $Cs_2O$ is less than the mole percent $Li_2O$ and provided that 0.25 times the mole percent $Li_2O$ plus 0.35 times the mole percent $Na_2O$ plus 0.625 times the mole percent $K_2O$ plus the mole percent $Rb_2O$ plus 1.053 times the mole percent $Cs_2O$ is less than the mole percent $Ga_2O_3$. Furthermore, $Al_2O_3$ may be substituted for part of the gallium oxide in the ratio of 0.9 mole percent $Al_2O_3$ for 1 mole percent $Ga_2O_3$ up to an alumina content not exceeding the gallium oxide content. Obviously, in this manner, every 0.9 mole percent $Al_2O_3$ is equivalent to 1 mole percent $Ga_2O_3$. Therefore, in determining the above noted mole percent ratios and other relationships between alkali metal oxides and $Ga_2O_3$, the total effective amount of $Ga_2O_3$ is arrived at by taking into account the amount of $Al_2O_3$ in terms of its equivalent amount of $Ga_2O_3$ present in the glass composition. Of course, the small 0.1 mole percent difference between every 0.9 mole percent $Al_2O_3$ and the 1 mole percent $Ga_2O_3$ it replaced is made up mainly by the predominant constituent of the glass composition, viz. the glass network forming oxide. Such limited substitution will not materially affect the good Na+ sensitivity of the electrode.

The electrodes of this invention are generally indifferent to the particular anion present, such as chloride, bromide, iodide, hydroxyl, carbonate, bicarbonate, nitrate, acetate, sulphate, thiosulphate, ferrocyanide, ferricyanide, phosphate, etc. Nor are they affected by the presence of oxidizing or reducing substances.

It will be appreciated that the invention is not limited to the specific details shown in the examples and illustrations, and that various changes or modifications may be made within the ordinary skill of the art without departing from the spirit and scope of the invention.

We claim:

1. A glass electrode, including an active portion, for measuring sodium ion activity in ionic mixtures including the sodium, potassium and hydrogen ions, said active portion having a good selective sensitivity for sodium ions in said mixtures and being made of a glass composition consisting essentially of lithium oxide, gallium oxide and at least about 50 mole percent glass network forming oxide, and the ratio of the mole percent of lithium oxide to the mole percent of gallium oxide in said composition is less than 3.

2. A glass electrode of claim 1 wherein the glass network forming oxide is selected from the class consisting of $SiO_2$, $GeO_2$ and mixtures thereof.

3. A glass electrode of claim 2 wherein the ratio of the mole percent of lithium oxide to the mole percent of gallium oxide is not more than about 1.5 and the glass network forming oxide is about 50 to 75 mole percent of said composition.

4. A glass electrode of claim 1 wherein alumina is substituted for part of the gallium oxide in the ratio of 0.9 mole percent $Al_2O_3$ for 1 mole percent $Ga_2O_3$ up to an alumina content not exceeding the gallium oxide content.

5. A glass electrode of claim 1 wherein a minor amount of at least one oxide of alkali metal selected from the group consisting of sodium, potassium, rubidium and cesium is substituted for part of the lithium oxide such that the total mole percent of $Na_2O$, $K_2O$, $Rb_2O$ and $Cs_2O$ is less than the mole percent $Li_2O$ and that 0.25 times the mole percent $Li_2O$ plus 0.35 times the mole percent $Na_2O$ plus 0.625 times the mole percent $K_2O$ plus the mole percent $Rb_2O$ plus 1.053 times the mole percent $Cs_2O$ is less than the mole percent $Ga_2O_3$.

6. A glass composition exhibiting a good selective sensitivity to sodium ions in ionic mixtures including the sodium, potassium and hydrogen ions, said composition consisting essentially of lithium oxide, gallium oxide and at least about 50 mole percent glass network forming oxide, and the ratio of the mole percent of lithium oxide to the mole percent of gallium oxide in said composition is less than 3.

7. A glass composition of claim 6 wherein the glass network forming oxide is selected from the class consisting of $SiO_2$, $GeO_2$ and mixtures thereof.

8. A glass composition of claim 7 wherein the ratio of the mole percent of lithium oxide to the mole percent of gallium oxide is not more than about 1.5 and the glass network forming oxide is about 50 to 75 mole percent of said composition.

9. A glass composition of claim 6 wherein alumina is substituted for part of the gallium oxide in the ratio of 0.9 mole percent $Al_2O_3$ for 1 mole percent $Ga_2O_3$ up to an alumina content not exceeding the gallium oxide content.

10. A glass composition of claim 6 wherein a minor amount of at least one oxide of alkali metal selected from the group consisting of sodium, potassium, rubidium and cesium is substituted for part of the lithium oxide such that the total mole percent of $Na_2O$, $K_2O$, $Rb_2O$ and $Cs_2O$ is less than the mole percent $Li_2O$ and that 0.25 times the mole percent $Li_2O$ plus 0.35 times the mole percent $Na_2O$ plus 0.625 times the mole percent $K_2O$ plus the mole percent $Rb_2O$ plus 1.053 times the mole percent $Cs_2O$ is less than the mole percent $Ga_2O_3$.

11. In a process of selectively measuring sodium ion activity in an ionic mixture including the sodium, potassium and hydrogen ions, which process includes the steps of providing a glass electrode with an active portion that is selectively sensitive to sodium ions in the presence of other cations including potassium and hydrogen ions, subjecting the mixture to said electrode and to a standard reference half-cell, and operatively connecting the glass electrode and reference half-cell to a high impedance electrometric amplifier, the improvement comprising making said active portion from a glass composition consisting essentially of lithium oxide, gallium oxide and at least about 50 mole percent glass network forming oxide, and the ratio of the mole percent of lithium oxide to the mole percent of gallium oxide in the composition is less than 3.

12. The process of claim 11 wherein the glass network forming oxide is selected from the class consisting of $SiO_2$, $GeO_2$ and mixtures thereof.

13. The process of claim 12 wherein the ratio of the mole percent of lithium oxide to the mole percent of gallium oxide is not more than about 1.5 and the glass network forming oxide is about 50 to 75 mole percent of said composition.

14. The process of claim 11 wherein alumina is substituted for part of the gallium oxide in the ratio of 0.9 mole percent $Al_2O_3$ for 1 mole percent $Ga_2O_3$ up to an alumina content not exceeding the gallium oxide content.

15. The process of claim 11 wherein a minor amount of at least one oxide of alkali metal selected from the group consisting of sodium, potassium, rubidium and cesium is substituted for part of the lithium oxide such that the total mole percent of $Na_2O$, $K_2O$, $Rb_2O$ and $Cs_2O$ is less than the mole percent $Li_2O$ and that 0.25 times the mole percent $Li_2O$ plus 0.35 times the mole percent $Na_2O$ plus 0.625 times the mole percent $K_2O$ plus the mole percent $Rb_2O$ plus 1.053 times the mole percent $Cs_2O$ is less than the mole percent $Ga_2O_3$.

References Cited

UNITED STATES PATENTS 2,829,090  4/1958  Eisenman et al. _____ 204—1
3,041,252  6/1962  Eisenman et al. _____ 204—1

OTHER REFERENCES

Nikol-skii et al., "Doklady Akad. Nauk, SSSR," 1962, 144(4), pages 844–848.

ROBERT K. MIHALEK, *Primary Examiner.*

T. TUNG, *Assistant Examiner.*